United States Patent Office 3,557,162
Patented Jan. 19, 1971

3,557,162
PROCESS FOR THE PREPARATION OF 17α-MONO-ESTERS OF 11β,17α,21-TRIHYDROXYSTEROIDS
Jan Lens, Voorschoten, and Arthur F. Marx, Delft, Netherlands, assignors to Koninklijke Nederlandsche Gist-en Spiritusfabriek N.V., Delft, Netherlands, a corporation of Netherlands
No Drawing. Filed Jan. 23, 1969, Ser. No. 793,574
Claims priority, application Great Britain, Jan. 23, 1968, 3,587/68
Int. Cl. C07c *167/28*
U.S. Cl. 260—397.45
2 Claims

ABSTRACT OF THE DISCLOSURE

17α-monoesters of 11β,17α,21 - trihydroxysteroids are prepared by silylating the 11β-hydroxyl group of an 11β,17α-dihydroxy-21-acyloxy steroid to a silyloxy group, esterifying the 17α-hydroxyl group, and then removing the silyl group at the 11β position and the acyl group at the 21 position by hydrolysis or alcoholysis.

---

This invention relates to a novel process for the preparation of 17α-monoesters of 11β,17α,21-trihydroxysteroids.

It is known that mild esterification of 11β,17α,21-trihydroxysteroids results in the formation of 21-monesters, while under more vigorous conditions 11β,21-diesters are produced. Even more vigorous conditions result in the formation of the 11β,17α,21-triesters of the 11β,17α,21-trihydroxysteroids. The 17α-monoesters of these steroids cannot be prepared in this manner.

It is also known that the selective hydrolysis of the 11β,17α,21-triesters gives rise to difficulties. Under mild hydrolyzing conditions, the 21-ester group is easily removed. If hydrolysis is carried out more vigorously, the 17α-acyl group will rearrange into a 21-acyl group, whereupon it is easily removed. After hydrolysis of the 17α- and the 21-acyl groups, the 11β-acyl group is removed only after the application of more vigorous conditions.

According to British patent specification 1,097,164, an 11β,17α - dihydroxy - 21 - acyloxysteroid is acylated at the 11β-position to the 11β-trihalogenoacetoxy-17α-hydroxy-21-acyloxysteroid, using trihalogenoacetic anhydride in pyridine at a temperature of about −20° C. The starting steroid for this procedure, the 11β,17α-dihydroxy-21-acyloxysteroid, can be prepared according to British patent specification 1,097,165 by treating an 11β, 17α,21-trihydroxysteroid with an acid anhydride or an acid halogenide in the presence of a tertiary organic base at a temperature of 0–30° C. for 1–24 hours. The 11β-trihalogenoacetoxy-17α-hydroxy-21-acyloxysteroid is then acylated at the 17α-position by treating it with a lower alkanoic acid or the anhydride thereof at room temperature, using a strong acid catalyst. According to that process it is also possible to effect the acylation with an alkanoic acid as an acylating agent at a temperature of about 80° C. in the presence of trifluoroacetic anhydride. The 11β-trihalogenoacetyl group is then removed selectively by treating the 11β-trihalogenoacetoxy-17α,21 - diacylsteroid with a salt of an acid with a pKa between 2.3 and 7.3, in a lower alcohol. The 11β-hydroxy-17α, 21-diacylsteroid thus obtained is finally converted into the 11β,21-dihydroxy - 17α - acyloxysteroid, for example by hydrolysis with perchloric acid in methanol at 0° C.

It is also possible to prepare 11β,21 - dihydroxy-17α-acyloxysteroids by partially using the process according to Dutch patent application 6701919. In accordance to that patent application, 11β,17α,21-trihydroxysteroids can be converted into the corresponding 21-methane sulfonates with methane sulfonic acid chloride in dry pyridine at a temperature of 0° C. The 21-methane sulfonate can then be converted into the 11β-nitrate-17α-hydroxy-21-methane sulfonate steroid by reaction with acetyl nitrate, whereupon the 17α-hydroxyl group is acylated with a carboxylic acid anhydride or an acid halogenide in the presence of a strong acid catalyst. According to that process the acylation can also be carried out with a carboxylic acid in the presence of trifluoro acetic anhydride. The 11β-nitrate group is then reduced selectively, using zinc dust and acetic acid as the reducing agent, thus obtaining the 11β-hydroxy-17α-acyloxy-21-methane sulfonate steroid.

The 11β-hydroxy - 17α - acyloxy-21-methane sulfonate steroids, which are, according to said patent specification, used as a starting material for the preparation of 11β-hydroxy - 17α - acyloxy-21-desoxysteroids, can also be converted into the 11β,21 - dihydroxy-17α-acyloxysteroids by mild hydrolysis of the 21-methane sulfonate group.

The above methods for the preparation of 17α-monoesters of 11β,17α,21-trihydroxysteroids by selective hydrolysis of 11β,17α,21-triesters thereof make it necessary to carry out the hydrolysis of the ester groups at the 11-position and at the 21-position respectively, in two different steps.

According to British patent specification 996,080 17α-monoesters of 11β,17α,21-trihydroxysteroids are prepared by reaction of 11β,17α,21-trihydroxysteroids with an ortho ester in an organic solvent, in the presence of an acid catalyst. A 1′-substituted 17α,21-(1′-alkoxy)-methylidenedioxysteroid is obtained, which is converted into the 17α-acyloxy-21-hydroxysteroid by treatment with an organic or inorganic acid. However, it turned out that this method cannot be used for the preparation of 17α-monoesters with an acyl group which contains more than 9-carbon atoms.

The process according to our invention is characterized by the fact that the 11β-hydroxyl group of an 11β,17α-dihydroxy-21-acyloxysteroid is protected by converting it into a silyloxy or substituted-silyloxy group. The 17α-hydroxyl group of the 11β-silyloxy or 11β-substituted-silyloxy-17α-hydroxy-21-acyloxysteroid can then be acylated with the desired acyl group, whereupon the silyl group at the 11-position and the acyl group at the 21-position are removed by alcoholysis or hydrolysis under mild conditions. The 21-monoester can be obtained by known methods, e.g. by acylation of the 11β,17α,21-trihydroxy-steroid with an anhydride of a lower alkanoic acid, preferably acetic acid, in the presence of a tertiary amine, such as pyridine.

A suitable process is disclosed, for example, in the above-mentioned British patent specification 1,097,165.

The 11β-silyl ethers are formed by treating the 11β-,17α-dihydroxy-21-acryloxysteroid with known silylating agents, for example halogenosilanes, e.g. trialkylhalogenosilanes, especially lower trialkylhalogenosilanes such as trimethylchlorosilane, triethylchlorosilane, triethylbromosilane, and the like, silyl amines such as hexamethyldisilazane, and the like, silylamides, such as trimethylsilylacetamide and bis-trimethylsilylacetamide, and the like, and other silylating agents well known to those skilled in the art. The silylating reaction with a halogenosilane is preferably effected in the presence of an HCl-acceptor, e.g. a tertiary amine, such as pyridine, dimethyl aniline, trimethylamine, and the like.

Esterification of the 17α-hydroxy group in the 11β-silyloxy-17α-hydroxy-21-acyloxysteroid can also be carried out by known methods employed in the esterification of hydroxyl groups. For example, esterification may be effected with a carboxylic acid anhydride and a strong acid, such as p-toluenesulfonic acid, or with a carboxylic acid and trifluoroacetic anhydride or the like. However, the reaction should not be carried out in the presence of a hydrohalogenic acid. Such an acid may tend to cause cleavage of the silyl ether group. "Esterification may also be termed "acylation".

After esterification or acylation of the 17α-hydroxyl group, the protecting groups at $C_{11}$ and $C_{21}$ are subjected to hydrolysis or alcoholysis, preferably under mild conditions to avoid any risk of the 17α-monoester being rearranged to the isomeric 21-monoester. The hydrolysis or alcoholysis is preferably carried out in the presence of water or of a lower alkyl alcohol, such as methanol, and a mineral acid, e.g. hydrochloric acid, in accordance with known techniques in this art. Preferably the acylation reaction at the 17α-position and the subsequent hydrolysis are combined. Therefore, the acylation reaction is preferably controlled by means of thin layer chromatography. When the reaction has been terminated, hydrolysis or alcoholysis can be carried out by adding water or a lower alcohol and a strong acid.

The novel method of this invention for the preparation of 17α-monoesters of steroids has two important advantages. It enables the introduction at the 17α-position of an acyl group derived not only from lower molecular weight carboxylic acids, such as butyric acid, but also from higher molecular weight carboxylic acids, e.g. carboxylic acids containing up to 14 carbon atoms, and above, such as myristic acid, while at the same time a 17α-monoester can be obtained in two steps starting from an 11β,17α,21-trihydroxysteroid-21-ester. In the method of this invention, various 21-monoesters of 11β,17α,21-trihydroxysteroids can be used as starting materials, in particular compounds such as the 21-monoesters of hydrocortisone, betamethasone and dexamethasone. The invention is, however, not limited to such compounds and the 21-monoesters of various other 11β,17α,21-trihydroxysteroids may be employed. Similarly, various ester or acyl groups may form such monoesters, although lower acyl groups are preferred. However, the invention is not limited to monoesters containing any particular 21-acyl group and any hydrolyzable acyl group may be used.

The various 17α-monoesters of 11β,17α,21-trihydroxysteroids which are obtained as end products of the process of this invention have valuable pharmacological properties, such as extremely potent topical anti-inflammatory activity. They are suitably used in conventional manner applied to other agents of such activity.

The 11-silyl ethers which are produced in the course of carrying out this invention are novel compounds not heretofore known, and their primary utility lies, of course, in their use as intermediates in the preparation of the end-product 17α-monoesters of 11β,17α,21-trihydroxy steroids.

For a better understanding of the invention, reference will now be made to the following examples which, however, are given by way of illustration only:

EXAMPLE I

Preparation of dexamethasone 17α-butyrate 15.2 g. of 9α-fluoro-11β,17α,21-trihydroxy-16α-methyl-pregna-1,4-diene-3,20-dione - 21 - acetate (dexamethasone 21-acetate) and 7 ml. of trimethylchlorosilane were refluxed in 35 ml. of dry pyridine. After three hours, another 7 ml. of trimethylchlorosilane were added. The reaction turned out to be complete after 6 hours. The reaction mixture was then diluted with methyl isobutyl ketone, and washed successively with dilute sulfuric acid, a sodium bicarbonate solution, and water. After evaporation in vacuo, crystalline dexamethasone-11β-trimethylsilylether-21-acetate was obtained. The yield was 4.6 g.

I.R. (CHCl$_3$): 3615, 1745, 1728, 1665, 1628, 1608, 1073 and 840 cm.$^{-1}$.

N.M.R. (CDCl$_3$): 0.25, 0.92 (doublet), 1.02, 1.48, 2.17, 2.94 (multiplet), 4.38 (multiplet), 4.93 (doublet), 6.1, 6.34 and 7.07 (AB-structure) p.p.m.

A mixture of 5 g. of dexamethasone 11β-trimethylsilyl-ether 21-acetate, 3.75 ml. of butyric anhydride, 100 mg. of p-toluenesulfonic acid (monohydrate) and 10 ml. of anhydrous benzene was refluxed under stirring and exclusion of moisture. Two more portions of 50 mg. of p-toluenesulfonic acid were added respectively after 2.5 hours and 5.5 hours of boiling. The reaction proved to be complete after 7 hours. The cooled reaction mixture was now diluted with 90 ml. of methanol, whereupon 15 ml. of 6 N hydrochloric acid were added. The mixture was left at room temperature for 24 hours, whereupon it was neutralized with sodium acetate and the methanol distilled off in vacuo. The residue was extracted with methyl isobutyl ketone and the extract evaporated to dryness in vacuo. The residue was now dissolved in benzene and chromatographed on silicagel. The matching fractions were combined and evaporated to dryness. The residue was crystallized from a methanol-water mixture. The yield was 0.890 g. of dexamethasone 17α-butyrate.

Melting point: 188.5°–190° C., $[\alpha]_D = +0.5°$ (c.=1.0; CHCl$_3$); $[\alpha]_D = +2.6°$ (c.=1.0; dioxan);

$$\lambda_{max.}^{CH_3OH} = 238.5 \, m\mu; \, E_{1 \, cm.}^{1\%} = 325$$

I.R. (CHCl$_3$): 3610, 3500, 1728, 1708, 1665, 1630, 1608 and 1175 cm.$^{-1}$.

N.M.R. (CDCl$_3$): 0.93 (triplet), 0.99 (doublet), 1.04, 1.56, 2.28 (quartet), 2.87, 4.30, 6.14, 6.35 and 7.29 (AB-structure) p.p.m.

Calculated for C$_{26}$H$_{35}$O$_6$F(462) (percent): C, 67.51; H, 7.63. Found (percent): C, 67.62; H, 7.72.

EXAMPLE II

In an analogous way dexamethasone 17α-myristate was prepared.

Melting point: 138°–142° C., $[\alpha]_D = -2°$ (c.=1.0; CHCl$_3$)

$$\lambda_{max.}^{CH_3OH} = 239 \, m\mu; \, E_{1 \, cm.}^{1\%} = 246$$

I.R. (CHCl)$_3$: 3615, 3500, 1729, 1709, 1667, 1630, 1609 and 1175 cm.$^{-1}$.

N.M.R. (CDCl$_3$): 0.90, 1.04, 1.28, 1.59, 2.29 (quartet), 4.30, 6.15, 6.35 and 7.28 (AB-structure) p.p.m.

Calculated for C$_{35}$H$_{55}$O$_6$F (602) (percent): C, 71.73; H, 9.20. Found (percent): C, 71.59; H, 9.17.

EXAMPLE III

Preparation of hydrocortisone 17α-butyrate (A) Preparation of the 11β-trimethylsilyl-ether: 1.5 ml. of trimethylchlorosilane were added to a solution of 3.4 g. of hydrocortisone 21-acetate in 8 ml. of pyridine and the mixture was stirred at room temperature for 90 minutes. The reaction mixture was diluted with 100 ml. of methyl isobutyl ketone and 16 ml. of 6 N sulfuric acid were added under agitation and cooling. The organic layer was separated and washed with dilute sulfuric acid, 10% aqueous sodium bicarbonate and then with water. The solution was concentrated in vacuo to a small volume and the crystallized hydrocortisone 11β-trimethylsilyl-ether 21-acetate was collected: yield 4.0 g.; melting point: 195°–197° C.;

$$[a]_D = +145° (c.=1.0; CHCl_3)$$

Calculated for C$_{26}$H$_{40}$O$_6$Si (476.7) (percent): C, 65.51; H, 8.46. Found (percent): C, 65.70; H, 8.43.

I.R. (CHCl$_3$): 3610, 1743, 1724, 1660, 1612, 1060 and 838 cm.$^{-1}$.

N.M.R. (CDCl$_3$): 0.15, 0.90, 1.37, 2.16, 3.33, 4.46, 4.80–5.80 and 5.66 p.p.m.

M.S. mol. peak at 476.

(B) Esterification of the 17α-hydroxyl group: To a mixture of 365 ml. of butyric anhydride, 10 ml. of anhydrous benzene and 50 mg. of p-toluenesulfonic acid were added 5 g. of hydrocortisone 11β-trimethylsilyl-ether 21-acetate and the reaction mixture was refluxed for 60 to 90 minutes. It was then cooled and diluted with 100 ml. of benzene. The solution was washed with 10% aqueous sodium bicarbonate and then with water. The solution obtained was dried on anhydrous magnesium sulphate and concentrated to dryness in vacuo. The yield was 7.0 g. of amorphous hydrocortisone 11β-trimethylsilyl-ether 17α-butyrate 21-acetate.

(C) Solvolysis of hydrocortisone 11β-trimethylsilyl-ether 17α-butyrate 21-acetate: To a solution of 7 g. of amorphous hydrocortisone 11β-trimethylsilyl-ether 17α-butyrate 21-acetate in 15 ml. of methanol was added 2 ml. of 6 N hydrochloric acid and the mixture was stirred at room temperature for 42 hours. The reaction mixture was then poured into 100 ml. of water and the liquids decanted. The insolubles were dissolved in methylene chloride, the solution washed with water and dried on magnesium sulphate. The solution was concentrated to dryness in vacuo. The residue was crystallized from ethyl acetate containing a trace of acetic acid. The yield was 3.1 g. of hydrocortisone 17α-butyrate containing only a trace of hydrocortisone 21-butyrate.

Pure hydrocortisone 17α-butyrate has a melting point of 204°–207° C.; $[\alpha]_D = +49°$ (c.=1.0; CHCl$_3$).

Calculated for $C_{25}H_{36}O_6$ (percent): C, 69.42; H, 8.39. Found (percent): C, 69.62; H, 8.38.

I.R. (CHCl$_3$): 3612, 3500, 1725, 1665, 1614, 1275 and 1175 cm.$^{-1}$.

N.M.R. (CDCl$_3$): 0.96, 1.47, 3.15 (multiplet), 4.29, 4.5 (multiplet) and 5.7 p.p.m.

EXAMPLE IV

Preparation of hydrocortisone 17α-adamantylcarboxylate

A mixture consisting of 1 g. of hydrocortisone 11β-trimethylsilyl-ether 21-acetate, 1.54 g. of adamantylcarboxylic anhydride, 10 mg. of p-toluenesulfonic acid in 2 ml. of benzene (anhydrous) was refluxed for 7 hours. The reaction mixture was diluted with 20 ml. of benzene and neutralized with NaHCO$_3$. The crystallized sodium adamantylcarboxylate was filtered off and the filtrate was evaporated to dryness in vacuo. The residue was dissolved in a mixture consisting of 20 ml. of methanol and 1.5 ml. of 6 N hydrochloric acid and boiled for 3 hours. After cooling, the mixture was neutralized with sodium acetate and the steroid precipitated by addition of water. The precipitate was filtered off, dried and chromatographed on a silicagel-column using a benzene-acetone (10:1) mixture as an eluent.

After combination of the matching fractions and concentration in vacuo, 100 mg. of hydrocortisone 17α-adamantylcarboxylate were obtained.

Crystallization from heptane gave a product melting between 224°–229° C.; $[\alpha]_D = +48.5°$ (c.=1.0; CHCL$_3$).

I.R. (CHCl$_3$): 3615, 3500, 1715, 1665, 1615 and 1270 cm.$^{-1}$.

N.M.R. (CDCl$_3$): 0.94, 1.46, 1.72, 1.86, 4.22, 4.55 and 5.72 p.p.m.

EXAMPLE V

Preparation of hydrocortisone 17α-myristate (A) A mixture consisting of 3 g. of hydrocortisone 11β-trimethylsilyl-ether 21-acetate, 5.92 g. of myristic anhydride, 30 mg. of p-toluenesulfonic acid in 6 ml. of benzene (anhydrous) was refluxed for 2 hours. The reaction mixture was diluted with 20 ml. of benzene and washed first with a dilute aqueous sodium carbonate solution and then with water. The extract was evaporated in vacuo to dryness and redissolved in a small amount of methanol, whereupon sodium myristate crystallized.

The precipitate was filtered off and the filtrate diluted with methanol to 60 ml. To this solution 5 ml. of methylene chloride and 10 ml. of 6 N hydrochloric acid were added. The reaction mixture was left at room temperature for 24 hours and then neutralized with a concentrated aqueous sodium acetate solution.

The organic solvent was evaporated in vacuo as much as possible and the aqueous residue extracted with methyl isobutyl ketone. The extract was evaporated to dryness in vacuo and the residue purified on a silicagel-column using a benzene-acetone (10:1) mixture as an eluent. The fractions containing hydrocortisone 17α-myristate were combined and evaporated to dryness. 580 mg. of amorphous chromatographically pure hydrocortisone 17α-myristate were obtained.

I.R. (CHCl$_3$): 3620, 3500, 1720, 1663 and 1615 cm.$^{-1}$.

N.M.R. (CDCl$_3$): 0.88, 0.95, 1.26, 1.47, 3.32, 4.3 and 4.5 p.p.m.

Mixed anhydride method (B) A mixture consisting of 1 g. of hydrocortisone 11β-trimethylsilyl-ether 21-acetate, 1.14 g. of myristic acid, 2.5 ml. of trifluoroacetic anhydride in 2 ml. of anhydrous methylene chloride was stirred at room temperature for 1 hour. The reaction mixture was diluted with 50 ml. of methylene chloride, washed with a sodium bicarbonate solution and with water and evaporated to dryness in vacuo. The residue was treated with a mixture consisting of 50 ml. of methanol, 7.5 ml. of 3 N hydrochloric acid and 10 ml. of methylene chloride at room temperature. After 1 hour the mixture was neutralized with an aqueous sodium acetate solution, concentrated in vacuo and the residue extracted with methyl isobutyl ketone.

The extract was evaporated to dryness in vacuo and the residue chromatographed on a silicagel column (elution with a benzene-acetone (20:1) mixture). 470 mg. of hydrocortisone 17α-myristate-21-acetate were obtained.

Melting point: 122°–126° C.; $[\alpha]_D = +59.7°$ (c.=1.0; CHCl$_3$).

190 mg. of the diester were added to a mixture of 20 ml. of methanol, 3 ml. of 6 N hydrochloric acid and 2.5 ml. of methylene chloride and stirred at room temperature for 24 hours. After neutralization with an aqueous sodium acetate solution the organic solvents were evaporated under reduced pressure and the aqueous residue extracted with methyl isobutyl ketone. The extract was evaporated to dryness in vacuo and the residue chromatographically purified as described under A. 160 mg. of amorphous product were obtained. This product was, according to its I.R. and N.M.R. spectra, identical to the product obtained according to the method described under A.

EXAMPLE VI

Preparation of hydrocortisone 17α-cyclipropylcarboxylate

A mixture of 5 g. of hydrocortisone 11β-trimethylsilyl-ether 21-acetate, 50 mg. of p-toluenesulfonic acid monohydrate, 3.5 ml. of cyclopropane carboxylic acid anhydride and 10 ml. of dry benzene was refluxed under anhydrous conditions. After 1.5 hours the reaction was stopped, the reaction mixture cooled to room temperature and diluted with 90 ml. of methanol. After addition of 5 ml. of 6 N hydrochloric acid the reaction mixture was stored at room temperature for 48 hours. Then it was neutrilized using a solution of 5.5 g. of sodium acetate in 30 ml. of water. The mixture obtained was concentrated in vacuo to a volume of about 30 ml. and the residue extracted with methyl isobutyl ketone. The organic extract was evaporated to dryness in vacuo.

The residue was purified chromatographically on a column containing 500 g. of silicagel and using a benzene-acetone (10:1) mixture as an eluent. The matching fractions were combined and evaporated to dryness in vacuo. The crystalline residue was recrystallized from an acetone-heptane mixture. 1.86 g. of pure hydrocortisone 17α-cyclopropylcarboxylate were obtained.

Melting point: 213°–215° C.; $[\alpha]_D = +69°$ (c.=1.0; CHCl$_3$).

I.R. (CHCl$_3$): 3612, 3500, 1718, 1664, 1617 and 1178 cm.$^{-1}$.

N.M.R. (CDCl$_3$): 0.9, 1.45, 4.25, 4.52 and 5.72 p.p.m.

Calculated for $C_{25}H_{34}O_6$ (percent): C, 69.77; H, 7.90.
Found (percent): C, 69.67 and 69.62; H, 8.03 and 7.99.

EXAMPLE VII

Preparation of hydrocortisone 17α-butyrate

To a mixture of 3.65 ml. of butyric anhydride, 10 ml. of anhydrous dioxane and 50 mg. of p-toluenesulfonic acid was added 5 g. of hydrocortisone 11β-trimethylsilylether 21-acetate and the reaction mixture was heated at approximately 100° C. for 2 hours. It was then cooled and 10 ml. of methanol and 3 ml. of 3 N hydrochloric acid were added. The mixture was stirred at room temperature for about 50 hours, and then 100 ml. of water were added. The liquids were decanted and the oily precipitate was crystallized from ethyl acetate containing a trace of acetic acid. The yield was 2.7 g. of hydrocortisone 17α-butyrate.

As will be seen from the foregoing examples, the acyl groups introduced at the 17α-position may be of various types. For example, they may be hydrocarbon groups of a straight, branched, or cyclic, including bridged ring, structure. This structure may be saturated or unsaturated, and may be substituted.

In general, as previously indicated, the individual reaction steps, e.g. silylation and esterification, are carried out in accordance with conventional techniques in the art, the same being true of the hydrolysis or alcoholysis step. In this connection, reference is made to the above-noted British and Dutch publications for typical esterification and hydrolysis or alcoholysis (solvolysis) procedures. Silylation procedures are described, for example, in "Organosilicon Compounds" by C. Eaborn (Butterworths Scientific Publications, London, 1960), particularly chapter 9. Thus, the acylation or esterification at the 17α-position is advantageously carried out in a solvent which is inert in the reaction environment. Any solvent of this type may be employed, such as hydrocarbon solvents, e.g. benzene, ethers, e.g. dioxane, halogenated solvents, and the like. Temperature is not a specific parameter in the silylation and esterification reactions, sufficient heat being applied, where necessary, to cause the reaction to proceed at a reasonable speed. Ordinarily, temperatures of about 15° C. to about 120° C. are suitable, with the refluxing temperature of the particular solvent employed being particularly convenient in the case of the esterification reaction. The silylation reaction can ordinarily be readily effected at room temperature. The same is true of the hydrolysis or alcoholysis reaction, which ordinarily requires no application of heat and in which temperature is not critical.

It is intended, therefore, that the specific disclosures contained in the foregoing description are to be interpreted as illustrative only and not as limitative of the invention.

We claim:

1. A process for producing 17α-monoesters of 11β,17α,21-trihydroxysteroids which comprises silylating the 11-hydroxyl group of an 11β,17α-dihydroxy-21-acyloxy steroid to a silyloxy group, esterifying the 17α-hydroxyl group, and then removing the silyl group at the 11β-position and the acyl group at the 21-position by hydrolysis or alcoholysis.

2. A process as defined in claim 1, wherein the silylation of the 11β-hydroxyl group is carried out with a trialkylhalogenosilane in the presence of a tertiary amine.

No references cited.

ELBERT L. ROBERTS, Primary Examiner